(12) United States Patent
Iwakura et al.

(10) Patent No.: US 9,301,054 B2
(45) Date of Patent: Mar. 29, 2016

(54) ELECTROMECHANICAL TRANSDUCER AND ELECTROCOUSTIC TRANSDUCER

(71) Applicant: Rion Co., Ltd., Tokyo (JP)

(72) Inventors: Takashi Iwakura, Tokyo (JP); Munehiro Date, Tokyo (JP)

(73) Assignee: RION CO., LTD., Kokubunji-shi, Tokyo (JP)

( * ) Notice: Subject to any disclaimer, the term of this patent is extended or adjusted under 35 U.S.C. 154(b) by 129 days.

(21) Appl. No.: 14/167,636

(22) Filed: Jan. 29, 2014

(65) Prior Publication Data
US 2014/0270276 A1    Sep. 18, 2014

(30) Foreign Application Priority Data
Mar. 15, 2013 (JP) .................................. 2013-054305

(51) Int. Cl.
*H04R 1/00* (2006.01)
*H04R 9/06* (2006.01)
*H04R 11/02* (2006.01)
*H02K 35/06* (2006.01)
*H04R 11/00* (2006.01)

(52) U.S. Cl.
CPC ................ *H04R 11/02* (2013.01); *H02K 35/06* (2013.01); *H04R 1/00* (2013.01); *H04R 11/00* (2013.01); *H04R 2460/13* (2013.01)

(58) Field of Classification Search
CPC ........ H04R 11/00; H04R 11/02; H04R 11/04; H04R 2460/13
See application file for complete search history.

(56) References Cited

U.S. PATENT DOCUMENTS

| 1,732,644 A | 10/1929 | Farrand |
| 1,784,517 A * | 12/1930 | Farrand ..................... 335/231 |
| 4,473,722 A | 9/1984 | Wilton |
| 7,869,610 B2 | 1/2011 | Jayanth et al. |
| 2005/0135651 A1* | 6/2005 | Hakansson .................. 381/396 |

FOREIGN PATENT DOCUMENTS

| JP | 2006-41768 A | 2/2006 |
| WO | WO 2004/049757 A1 | 6/2004 |

OTHER PUBLICATIONS

European Search Report dated Jun. 27, 2014.

* cited by examiner

*Primary Examiner* — Matthew Eason
(74) *Attorney, Agent, or Firm* — McGinn Law Group, PLLC.

(57) ABSTRACT

An electromechanical transducer of the invention comprises a structural unit, an armature, and first and second elastic members. The structural unit includes at least one pair of magnets, a yoke conducting a magnetic flux generated by the magnets, and a coil supplied with an electric signal. The armature has an inner portion disposed to pass through an internal space of the structural unit and first and second outer portions protruding on both sides from the inner portion, and the armature constitutes a magnetic circuit with the structural unit via two regions through which components of the magnetic flux flow in directions opposite to each other in the inner portion. The first and second elastic members connect between the first and second outer portions of the armature and the structural unit, respectively.

14 Claims, 13 Drawing Sheets

ELECTROMECHANICAL TRANSDUCER AND ELECTROCUSTIC TRANSDUCER

BACKGROUND OF THE INVENTION

1. Field of the Invention

The present invention relates to an electromechanical transducer that transduces an electric signal into mechanical vibration and an electroacoustic transducer that transduces an electric signal into sound, and particularly relates to an electromechanical transducer and an electroacoustic transducer that comprise a driving unit including an armature, a yoke, a coil and magnets.

2. Description of Related Art

An electroacoustic transducer used in a hearing aid or the like is provided with a driving unit including an armature, a yoke, a coil and a pair of magnets, etc., and is configured to drive the armature in response to an electric signal supplied to the coil so that relative vibration between the armature and other members is transduced into sound. For example, as examples of a so-called balanced armature type (hereinafter, referred to as "balanced type") electromagnetic transducer, Patent Reference 1 discloses a structural example of a magnetic circuit using a U-shaped armature, and Patent Reference 2 discloses a structural example of a magnetic circuit using an E-shaped armature. Patent Reference 3 discloses a structural example for improving shock resistance in an electroacoustic transducer provided with a magnetic circuit of the above-mentioned balanced type. In any of these structural examples, the armature is connected to the yoke so as to form the magnetic circuit. Further, in any of the above cases, the armature needs to be formed so that restoring force due to elasticity of the armature itself when one end thereof is displaced is larger than magnetic forces (attraction) of the magnets that are generated by the displacement of the armature. In case of employing the structures disclosed in the Patent References 1 to 3, it is essential to form the armature using soft magnetic material.

[Patent Reference 1] U.S. Pat. No. 7,869,610
[Patent Reference 2] U.S. Pat. No. 4,473,722
[Patent Reference 3] Japanese Patent Application Laid-open No. 2006-041768

However, in the above conventional balanced type electromagnetic transducer, since the armature constitutes a part of the magnetic circuit, it is required to satisfy design requirements for magnetic property of the magnetic circuit. Although the armature is required to be designed so that the restoring force caused by displacement of the armature is larger than the magnetic forces of the magnets, as described above, the armature of the conventional structure is required to be designed so as to satisfy both magnetic and mechanical requirements because the armature gets the restoring force due to the elasticity of its own. For example, in order to improve the shock resistance of the armature, an option is to increase thickness of the armature. However, if the thickness of the armature is increased, it is not possible to obtain sufficient amount of displacement within an elasticity range of the armature. Further, since the armature is required to have necessary magnetic property, it is difficult to use general spring material having large yield stress and strong shock resistance. In general, magnetic annealing treatment is performed for the armature after forming process for the purpose of extracting the magnetic property of its material, and therefore it is also difficult to increase the yield stress of the armature by heat treatment. As described above, according to the conventional structure, it is inevitable that degree of freedom in designing the armature is largely restricted.

SUMMARY

One of aspects of the invention is an electromechanical transducer transducing an electric signal into mechanical vibration, the electromechanical transducer comprising: a structural unit in which at least one pair of magnets (14 to 17) a yoke (11, 12) conducting a magnetic flux generated by the magnets, and a coil (13) supplied with the electric signal are integrally arranged; an armature (22) having an inner portion (22a) disposed to pass through an internal space of the structural unit and first and second outer portions (22b, 22c) protruding on both sides from the inner portion, the armature constituting a magnetic circuit with the structural unit via two regions through which components of the magnetic flux flow in directions opposite to each other in the inner portion; a first elastic member (23) connecting between the first outer portion of the armature and the structural unit; and a second elastic member (24) connecting between the second outer portion of the armature and the structural unit.

According to the electromechanical transducer of the invention, when no current flows in the coil, the armature is initially in a state of being positioned at a predetermined position of an internal space of the structural unit including a through hole of the coil, and the armature is relatively displaced by magnetic forces applied to the inner portion due to a current flowing in the coil. Then, each of the two elastic members gives a restoring force being proportional to amount of the displacement of the armature and having a direction reverse to that of the displacement. Thus, since the structure for utilizing the restoring force of the two elastic members attached to both ends of the armature, without utilizing elasticity of the armature itself, it is possible to improve the degree of freedom in designing the armature. That is, since a sufficient amount of displacement can be obtained without thinning thickness of the armature, it is possible to improve the shock resistance of the magnetic circuit.

In the invention, for example, a pair of spring members can be used as the first and second elastic members. In this case, the restoring force can be given by appropriately setting a spring force of each of the spring members.

The invention may further comprise a housing in which the structural unit, the armature, and the first and second elastic members are entirely contained. In this case, the armature and the housing can be relatively displaced from each other by fixing respective ends of the first and second outer portions of the armature to the housing.

In the invention, the yoke may be formed by joining a plurality of yoke members together, and there may be provided one or a plurality of spacers for positioning each of the yoke members. Further, two pairs of magnets facing each other with air gaps can be used as the at least one pair of magnets in order to generate two magnetic fluxes reverse to each other that pass through the air gaps of the armature. Further, the two magnetic fluxes may be formed by combining the pair of magnets and the yoke.

The invention may comprise protectors that limit range of movement of the armature relative to the structural unit, which are located in vicinities of the first and second outer portions of the armature in the structural unit. Thereby, it is possible to take effective measures against plastic deformation caused by a shock of the spring members.

Another aspect of the invention is an electroacoustic transducer transducing an electric signal into sound, the electroacoustic transducer comprising: a structural unit in which at least one pair of magnets, a yoke conducting a magnetic flux generated by the magnets, an armature having an inner portion disposed to pass through an internal space of the structural unit and first and second outer portions protruding on both sides from the inner portion, the armature constituting a magnetic circuit with the structural unit via two regions through which components of the magnetic flux flow in directions opposite to each other in the inner portion; a first elastic member connecting between the first outer portion of the armature and the structural unit; a second elastic member connecting between the second outer portion of the armature and the structural unit; a pair of rods each having one end fixed to each of ends of the first and second outer portions of the armature; and a diaphragm connected to respective other ends of the pair of rods, the diaphragm generating sound pressure in response to vibration of the armature relative to the structural unit.

The electroacoustic transducer of the invention may further comprises a housing for containing the diaphragm, a sound outlet being attached to the housing and externally outputting the sound generated by the diaphragm, a corrugation expanded around the diaphragm and is capable of being moved in a direction of the vibration of the diaphragm, and a frame portion formed around the corrugation and integrally fixed to the housing. In this case, by fixing the structural unit to the housing, relative vibration between the armature and the structural unit is reliably transduced into the sound so as to output the sound to outside.

As described above, according to the present invention, the pair of elastic members connecting between both ends of the armature and the structural unit is provided in order to give the restoring force for the displacement of the armature, without utilizing the elasticity of the armature itself, thereby improving degree of freedom in designing the armature. This structure enables both excellent magnetic characteristics and shock resistance, and it is possible to achieve a small-scale and high-power electromechanical transducer and/or electroacoustic transducer.

DETAILED DESCRIPTION OF THE PREFERRED EMBODIMENTS

Preferred embodiments of the present invention will be described with reference to accompanying drawings. Each of the following embodiments will support an example to which the present invention is applied, and the present invention is not limited to the embodiments. In the following, the present invention will be applied to a plurality of embodiments of an electromechanical transducer that transduces an electric signal into mechanical vibration and an electroacoustic transducer that transduces an electric signal into sound.

[First Embodiment]

Figure 1:
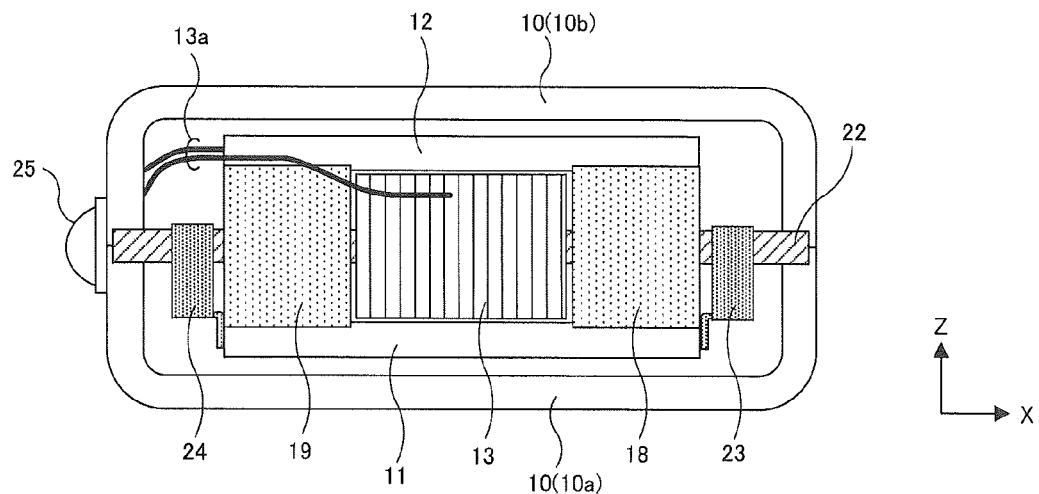
FIG. 1 is a front view showing a structure of an electromechanical transducer of a first embodiment.
Figure 2:
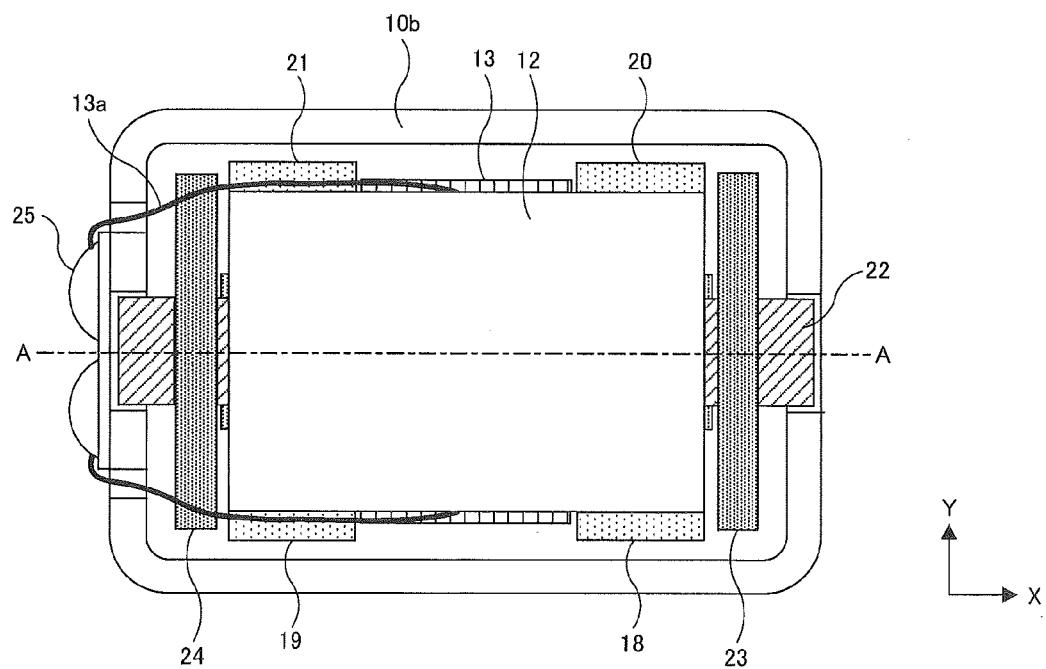
FIG. 2 is a top view showing the electromechanical transducer of FIG. 1 as viewed from the upper side of the figure.
Figure 3:
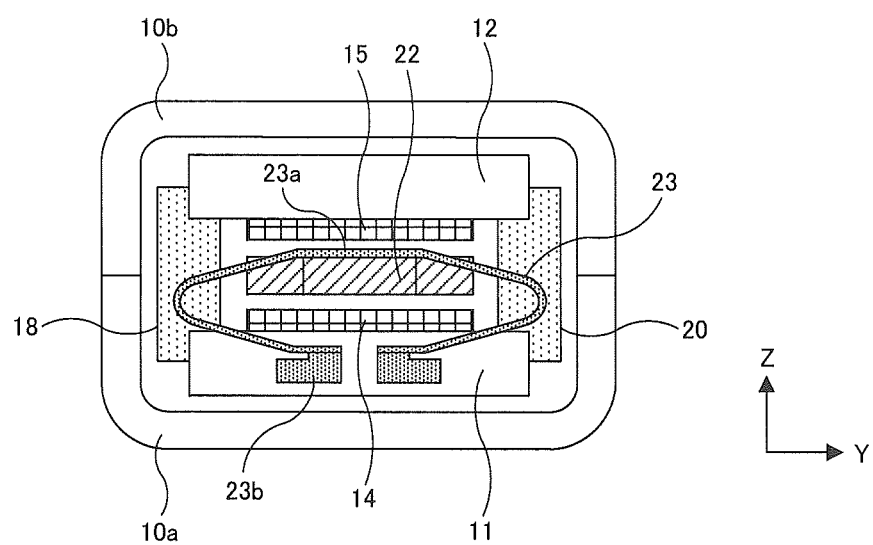
FIG. 3 is a right side view showing the electromechanical transducer of FIG. 1 as viewed from the right side of the figure.
Figure 4:
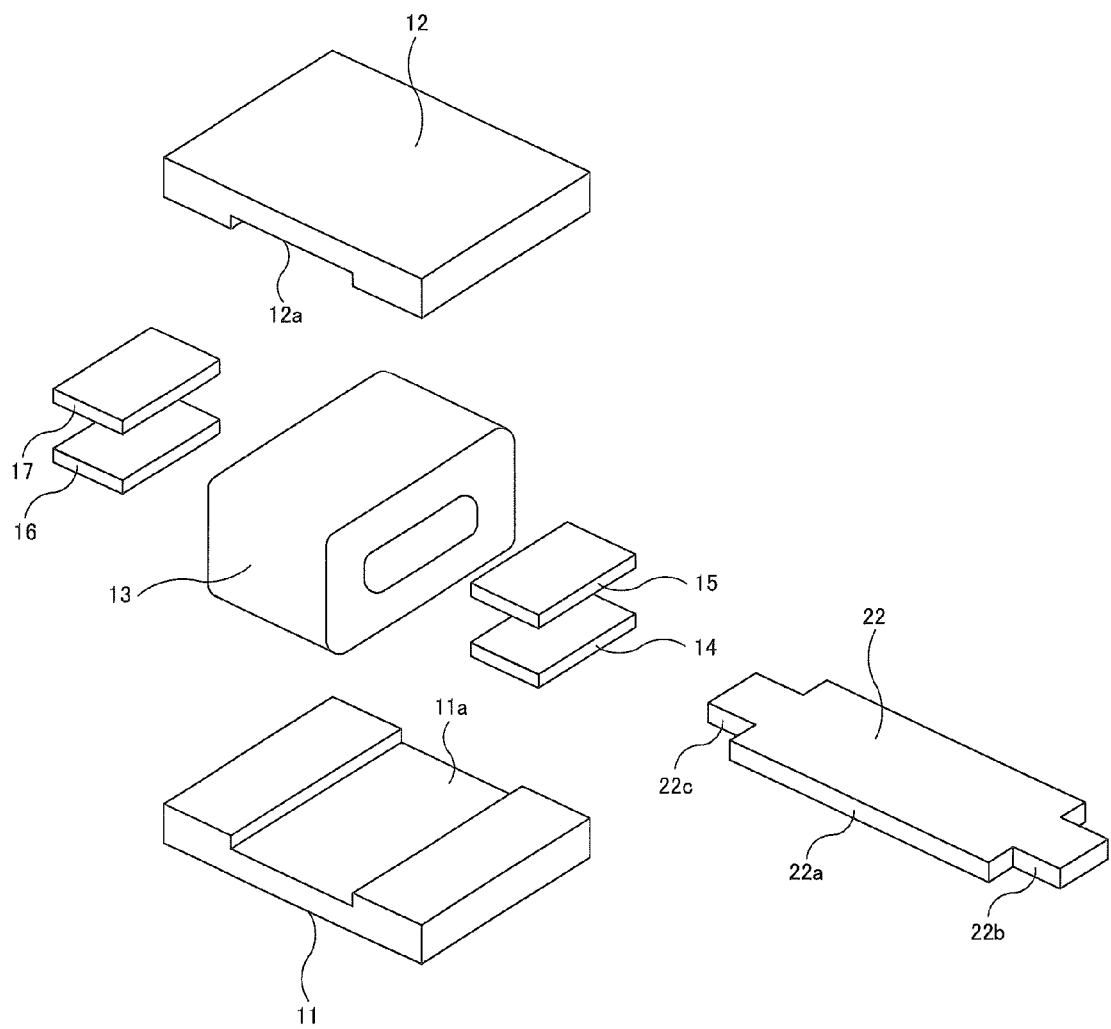
FIG. 4 is an exploded perspective view of a magnetic circuit portion in the electromechanical transducer of the first embodiment.
Figure 5:
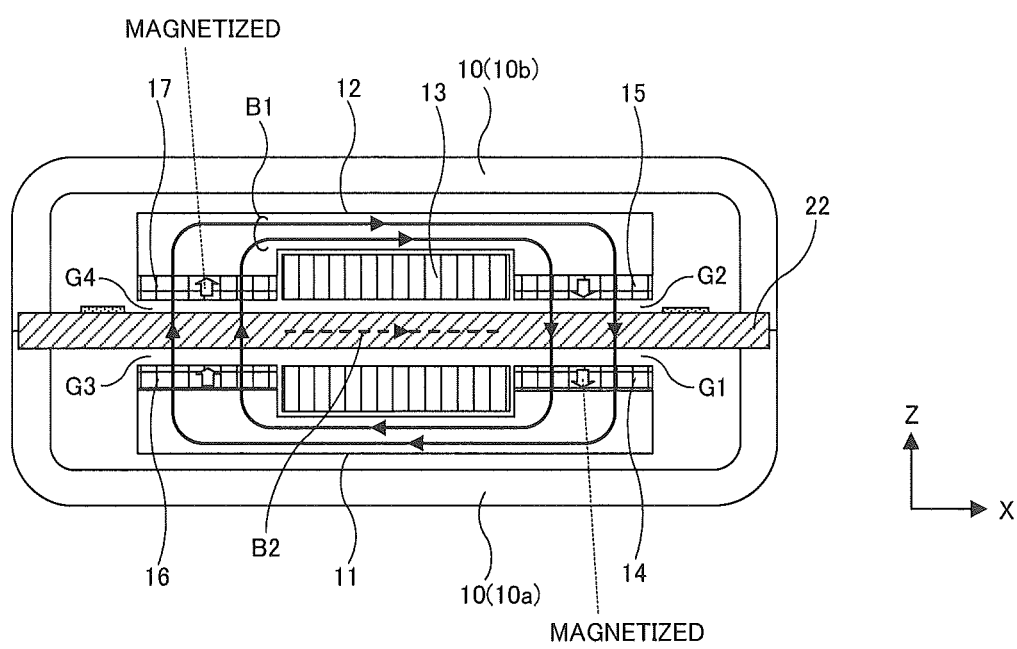
FIG. 5 is a cross-sectional structural view along an A-A cross section of FIG. 2.

An electromechanical transducer of a first embodiment of the present invention will be described with reference to FIGS. 1 to 5. FIG. 1 is a partially cutaway end view (front view) showing an internal structure of the electromechanical transducer of the first embodiment. On the right side of FIG. 1, an X direction and a Z direction are indicated by arrows, respectively. FIG. 2 is a partially cutaway end view (top view) showing the electromechanical transducer of FIG. 1 as viewed from the upper side of the figure along the Z direction, in which the X direction and a Y direction are indicated by arrows, respectively. FIG. 3 is a partially cutaway end view (right side view) showing the electromechanical transducer of FIG. 1 as viewed from the right side of the figure along the X direction, in which the X direction and the Y direction are indicated by arrows, respectively. FIG. 4 is an exploded perspective view of a later-described magnetic circuit portion in the electromechanical transducer of the first embodiment. FIG. 5 is a cross-sectional structural view along an A-A cross section of FIG. 2.

The electromechanical transducer of the first embodiment is provided with a housing 10 that houses the entire electromechanical transducer, and elements constituting a driving unit inside the housing 10 which include a pair of yokes 11 and 12, four magnets 14, 15, 16 and 17, a coil 13, four spacers 18, 19, 20 and 21, an armature 22, a spring member 23 (the first elastic member of the invention) and a spring member 24 (the second elastic member of the invention). The housing 10 has a structure formed by joining a lower housing member 10a and an upper housing member 10b that are vertically symmetrical to each other and various constituent elements of the above driving unit are arranged inside the housing 10. In the driving unit, the yokes 11 and 12, the four magnets 14 to 17, the coil 13 and the spacers 18 to 21 function as an integrally arranged structural unit of the invention, and the armature 22 passing through an internal space of this structural unit is disposed so as to be movable relative to the driving unit. In addition, although all of FIGS. 1 to 3 show internal structures that are viewed when the housing 10 is partially removed, the entire electromechanical transducer is actually covered by the housing 10.

As to the yokes 11 and 12, yoke members that are the lower yoke 11 and the upper yoke 12 face each other in the Z direction. As shown in FIG. 4, inwardly facing concave portions 11a and 12a are formed in central portions of the respective yokes 11 and 12, and the coil 13 having a through hole is sandwiched between the concave portions 11a and 12a of the upper and lower yokes 11 and 12 so that both ends of the through hole are open in the X direction. The coil 13 is positioned at the center of the yokes 11 and 12 and is fixed to inner surfaces of the yokes 11 and 12 by adhesive.

The magnets 14 to 17 are arranged symmetrically on both sides of the yokes 11 and 12 in the X direction. That is, a pair of magnets 14 and 15 is adhesively bonded to one opposed end faces of the yokes 11 and 12 in the X direction, and similarly a pair of magnets 16 and 17 is adhesively bonded to the other opposed end faces of the yokes 11 and 12 in the X direction.

The yokes 11 and 12 are supported by a pair of spacers 18 and 20 facing each other in the Y direction near the magnets 14 and 15 and a pair of spacers 19 and 21 facing each other in the Y direction near the magnets 16 and 17. Each of the four spacers 18 to 21 is formed in a convex shape toward inside, as shown in FIG. 3, and the yokes 11 and 12 are positioned above and below the convex shape and are fixed thereto by laser welding or adhesive.

The armature 22 is a long plate-like member extending in the X direction and is disposed so as to pass through a space between the pair of magnets 14 and 15, the through hole of the coil 13, and a space between the pair of magnets 16 and 17. As shown in FIG. 3, there are formed parallel interspaces between the armature 22 and the magnets 14 to 17 above and below the armature 22 (both sides in the Z direction), and the respective interspaces form air gaps G1, G2, G3 and G4 (FIG. 5). The example of the first embodiment shows a structure having the four magnets 14 to 17 of the same shape, the four spacers 18 to 21 of the same shape, and the four air gaps G1 to G4 of the same shape. Further, the armature 22 is disposed with an appropriate space such that the armature 22 does not contact the coil 13 when the armature 22 is displaced within a working range in the Z direction.

As shown in FIG. 4, the armature 22 is composed of an inner portion 22a positioned in a space facing the yokes 11 and 12 (the internal space of the structural unit) and outer portions 22b and 22c protruding from the space facing the yokes 11 and 12 on both sides. The inner portion 22a of the armature 22 is formed with a width comparable to that of the magnets 14 to 17 in the Y direction, and constitutes the magnetic circuit together with the yokes 11, 12, the magnets 14 to 17 and the coil 13. The outer portions 22b and 22c of the armature 22 are formed with a width thinner than that of the magnets 14 to 17 in the Y direction. Although the outer portions 22b and 22c may be formed with the same width as the magnets 14 to 17, their weight can be reduced by forming them with the width thinner than the magnets 14 to 17 so as to improve driving efficiency.

Although the outer portions 22b and 22c of the armature 22 are not required to have magnetic performance, they are required to serve primarily as mechanical elements, and the spring members 23 and 24 formed by bending plate-like members are attached to the outer portions 22b and 22c, respectively. As shown in FIG. 3, a central portion 23a (24a) of the spring member 23 (24) is fixed to the outer portion 22b (22c) of the armature 22 by laser welding or the like, and end portions 23b (24b) at both ends of the spring member 23 (24) are fixed to the lower yoke 11 by laser welding or the like. However, the spring members 23 and 24 may be fixed to the upper yoke 12, and, for example, one spring member 23 may fixed to the spring member 23 while the other spring member 24 may be fixed to the lower yoke 11, without being limited to the structure of FIG. 3.

The role of the spring members 23 and 24 is that, when the armature 22 is relatively displaced in the magnetic circuit relative to the air gaps G1 to G4, the spring members 23 and 24 give a restoring force that is proportional to amount of the displacement to the armature 22. In the first embodiment, the spring members 23 and 24 constitute the driving unit integrally with the magnetic circuit portion. Further, both ends of each of the outer portions 22b and 22c on both sides of the armature 22 are sandwiched between the upper and lower housing members 10a and 10b, which are fixed by adhesive or the like. By this structure, the above-mentioned constituent elements of the driving unit are contained in the housing 10 (the housing members 10a and 10b).

A pair of electric terminals 25 is provided at one outer end of the housing 10. A pair of leads 13a extending from the coil 13 is electrically connected to the electric terminals 25 by soldering. Thereby, it is possible to provide electricity to the coil 13 via the electric terminals 25 and the leads 13a from outside the housing 10.

The above connection portion of the armature 22 and the housing 10 needs to have sufficient stiffness such that vibration generated in the driving unit is reliably transmitted to the housing 10. If the connection portion does not have the sufficient stiffness, a stiffened member may be provided between the armature 22 and the housing 10 in order to obtain the sufficient stiffness.

The housing 10 has a structure such that portions other than those contacting the armature 22 and the leads 13a do not contact the driving unit, in which appropriate interspaces are formed so as not to contact the driving unit within a normal working range.

In general, in the electromechanical transducer of the first embodiment, the housing 10 is entirely closed by sealing connection portions between the housing members 10a and 10b by adhesive or the like.

Next, respective materials of the constituent elements of the electromechanical transducer of the first embodiment will be described. For example, soft magnetic material such as permalloy (45% Ni) is used for the yokes 11 and 12 and the armature 22. For example, a samarium-cobalt magnet, a neodymium magnet or an alnico magnet is used as the magnets 14 to 17. The soft magnetic material may be used to form the spacers 18 to 21, and also non-magnetic metal material may be used to form them. The non-magnetic material may be, for example, stainless steel such as SUS304, or titanium. Further, since attractive forces of the magnets 14 to 17 always act on the spacers 18 to 21, plastic material may be used to form the spacers 18 to 21 unless positions of the yokes 11 and 12 are changed by influence of the forces. For example, wiring material such as self-welding copper wire is used to form the coil 13. Spring material such as SUS for spring is used to form the spring members 23 and 24.

It is preferable to use as light material as possible to form the housing 10 within a strength range capable of supporting the electromechanical transducer. For example, plastic material or metal material such as stainless steel is used. When leakage magnetic flux from the magnetic circuit becomes a problem, for example, soft magnetic material such as permalloy (78% Ni) may be used as the material of the housing 10.

Next, an operation of the electromechanical transducer of the first embodiment will be described using FIG. 5. As shown in FIG. 5, the pair of magnets 14 and 15 and the pair of magnets 16 and 17 that are oppositely arranged via the coil 13 have been magnetized in directions reverse to each other. For example, the magnets 14 and 15 on the right of FIG. 5 are magnetized downward, and the magnets 16 and 17 on the left of FIG. 5 are magnetized upward. A magnetic flux B1 indicated by solid arrows is generated in the yokes 11 and 12 and the armature 22 by the magnets 14 to 17 magnetized in this manner.

Then, magnetic forces due to partial magnetic fluxes of the magnetic flux B1 that pass through the air gaps G1 to G4 act on the armature 22. Specifically, downward forces act on the armature 22 through the lower air gaps G1 and G3, and upward forces act on the armature 22 through the upper air gaps G2 and G4. When these four forces are not balanced, the armature 22 is displaced to a side of a larger force. Thus, the armature 22 is positioned so that the four forces are balanced in a state where no current flows in the coil 13. At this point, since the armature 22 is not displaced, the magnetic flux passing through the air gap G1 and the magnetic flux passing through the air gap G2 are approximately equal to each other, and the magnetic flux passing through the air gap G3 and the magnetic flux passing through the air gap G4 are approximately equal to each other. Therefore, in the armature 22, there is no net magnetic flux flowing through a portion surrounded by the coil 13.

When flowing the current in the coil 13 in the above state, a magnetic flux having a direction according to the direction of the current is generated in the portion surrounded by the coil 13 in the armature 22. For example, FIG. 5 shows a state where a magnetic flux B2 indicated by a dashed arrow is generated in the armature 22 due to the coil current. At this point, in consideration of directionality of the magnetic fluxes B1 and B2 in FIG. 5, the generation of the magnetic flux B2 causes magnetic fluxes of the air gaps G1 and G3 to increase, respectively, and causes magnetic fluxes of the air gaps G2 and G4 to decrease, respectively. As a result, the armature 22 is displaced downward by being applied with the downward magnetic force.

When the armature 22 is displaced downward, restoring forces for returning the displaced armature 22 to its original position are acted by the spring members 23 and 24. If a sum of the restoring forces by the spring members 23 and 24 is larger than the magnetic force applied to the armature 22, it is possible to avoid that the armature 22 sticks to the magnets 14 and 16. The above-described operation is the same as an operating principle of a so-called balanced armature type electromagnetic transducer. In addition, when the coil current flows in a direction reverse to the above direction, it may be assumed that the armature 22 is displaced upward by being applied with the upward magnetic force.

Regarding a portion composed of the yokes 11 and 12, the coil 13, the magnets 14 to 17 and the spacers 18 to 21 (the structural unit of the invention) other than the armature 22, a relative vibration between this structural unit and the armature 22 will be considered hereinafter. As described above, a driving force is generated in response to the current flowing when an electric signal is applied to the coil 13, and this driving force causes the above relative vibration. Since the both ends of the armature 22 are fixed to the housing 10 with sufficient stiffness, the driving force generated between the armature 22 and the structural unit is transmitted to the housing 10 via the armature 22 so as to vibrate the housing 10. In this manner, the electromechanical transducer of the first embodiment is configured to generate mechanical vibration corresponding to the electric signal applied to the electric terminals 25.

Figure 6:
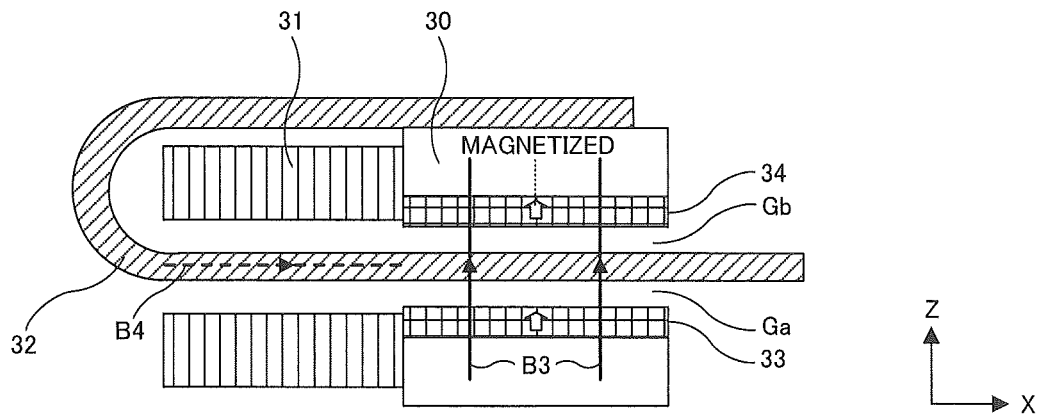
FIG. 6 is a view schematically showing a cross-sectional structure of a magnetic circuit portion in an electromagnetic transducer of a conventional balanced armature type as a comparison example to be compared with the electromechanical transducer of the first embodiment.
Figure 7:
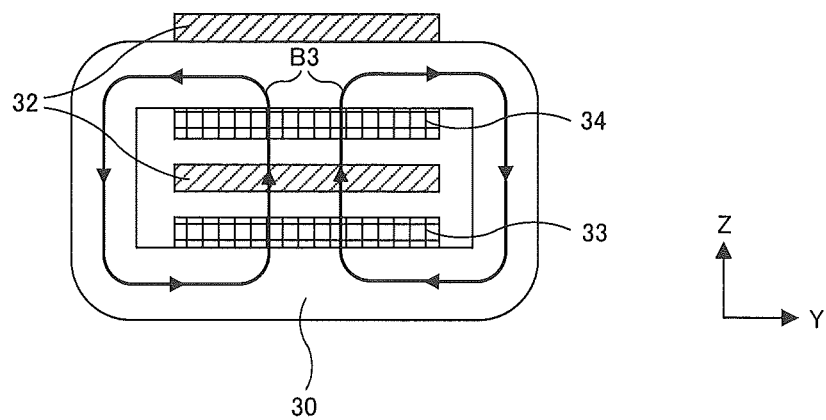
FIG. 7 is a cross sectional view of the magnetic circuit portion of FIG. 6 as viewed from the right side of the figure.

FIG. 6 schematically shows a cross-sectional structure of a magnetic circuit portion in an electromagnetic transducer of a conventional balanced armature type as a comparison example to be compared with the electromechanical transducer of the first embodiment. Further, FIG. 7 shows a cross sectional view of the magnetic circuit portion of FIG. 6 as viewed from the right side of the figure along the X direction. The magnetic circuit portion of the comparison example includes a yoke 30, a coil 31, an armature 32, and a pair of magnets 33 and 34. Further, interspaces between the pair of magnets 33 and 34 and the armature 32 form air gaps Ga and Gb. In the structure of the comparison example as shown in FIG. 6, when the armature 32 bended in a U-shape is displaced, it receives a restoring force due to elasticity of the armature 32 itself, and no members corresponding to the spring members 23 and 24 of the first embodiment are provided.

Further, the magnets 33 and 34 and the air gaps Ga and Gb are provided at one side of the armature 32 in the X direction, and this portion is formed so that the armature 32 is magnetically connected to the yoke 30. The pair of magnets 33 and 34 has been magnetized in an arrow direction. Thereby, a magnetic flux B3 is generated in the magnetic circuit that is symmetrical on both sides of a YZ plane in the yoke 30 and the armature 32, as shown in FIG. 7. Two magnetic forces due to partial magnetic fluxes of the magnetic flux B3 that pass through the air gaps Ga and Gb act on the armature 32. When no current flows in the coil 31, the armature 32 is positioned so that the above two magnetic forces are balanced. At this point, the magnetic fluxes passing through the upper and lower air gaps Ga and Gb become equal to each other, and in the armature 32, there is no magnetic flux flowing through a portion surrounded by the coil 31.

When flowing the current in the coil 31 in the above state, a magnetic flux is generated in the portion surrounded by the coil 31 in the armature 32. For example, FIG. 6 shows a state where a magnetic flux B4 indicated by a dashed arrow is generated in the armature 32 due to the coil current. The generation of the magnetic flux B4 causes a magnetic flux of the air gap Gb to increase and causes a magnetic flux of the air gap Ga to decrease. As a result, the armature 32 is displaced upward by being applied with the upward magnetic force. When the coil current is set to zero in this state, the armature 32 returns to its original position by being applied with the restoring force due to the elasticity of the U-shaped armature 32 itself. In this case, a driving force is generated according to the current flowing in the coil 31 to which the electric signal is applied, and this driving force vibrates the armature 32.

In the electromagnetic transducer having the structure shown in FIGS. 6 and 7, a state where the armature 32 is displaced from a balanced position will be considered hereinafter. For example, when the armature 32 is displaced toward the upper air gap Gb, the restoring force due to the elasticity of the armature 32 itself is proportional to the displacement, but it acts in a direction to return the displacement. A ratio of the elasticity relative to the displacement is referred to as "positive stiffness". On the other hand, since the air gap Gb becomes small, the magnetic flux in the air gap Gb increases, and the magnetic flux in the air gap Ga decreases. As a result, an upward magnetic force acts on the armature 32. The magnitude of the magnetic force at this point is approximately proportional to the displacement of the armature 32 from the balanced position, and the direction of the magnetic force is equal to the direction of the displacement.

Meanwhile, since the direction of the above magnetic force is reverse to that of the restoring force, a ratio of this magnetic force relative to the displacement is referred to generally as "negative stiffness".

A condition for the armature 32 to return to the original position when being displaced in the air gaps Ga and Gb is that the armature 32 has the positive stiffness larger than an absolute value of the negative stiffness. However, in the electromagnetic transducer having the above structure, it is preferable that the absolute value of the negative stiffness is relatively large in order to enhance the driving force within a predetermined magnitude range. Accordingly, the positive stiffness of the armature 32 itself needs necessarily to be large, and the thickness of the armature 32 needs to be thick to obtain a large restoring force by the armature 32. The thicker the thickness of the armature 32 is, the smaller the displacement within an elasticity range is.

In order to reduce size of the electromagnetic transducer having the above structure and drive it with a large amplitude, the thickness of the armature 32 needs to be thin. However, it is known that the positive stiffness of the armature 32 is proportional to the cube of the thickness, and correspondingly the negative stiffness needs to be small. As a result, even if the maximum amount of displacement can be large, the driving force of the vibration becomes small. Further, yield stress decreases due to the thinner thickness, which inevitably weakens shock resistance. That is, the electromagnetic transducer having the above structure has a trade-off relation between the maximum driving force of the vibration and the maximum amount of displacement. In this manner, according to the structure of the comparison example, since the restoring force due to the elasticity of the armature 32 itself is utilized, the thickness of the armature 32 is largely restricted in designing the armature 32.

On the other hand, in the structure of the electromechanical transducer of the first embodiment, the above restriction of the thickness is not necessary in designing the armature 22, as different from the comparison example shown in FIGS. 6 and 7. Specifically, the stiffness of the armature 22 of the first embodiment does not depend on its thickness and is determined depending on the spring members 23 and 24 that are different components. Therefore, it is possible to determine the thickness of the armature 22 independently of a desired stiffness. When the electromechanical transducer of the first embodiment receives a large shock in the Z direction in FIG. 5, the spring members 23 and 24 are deformed by an amount roughly corresponding to the size of the air gaps G1 to G4. However, by designing the spring members 23 and 24 so that deformation thereof within the elasticity range is sufficiently larger than the deformation of the above-mentioned amount, it is possible to improve the shock resistance in the Z direction. In contrast, when the conventional structure receives a large shock in the Z direction, the armature 32 itself is subjected to a large stress, and thus it is difficult to obtain sufficient shock resistance in the Z direction. Therefore, according to the electromechanical transducer to which the invention is applied, the restoring force is given to the armature 22 by using the spring members 23 and 24 as the different components without utilizing the elasticity of the armature 22 formed of the magnetic material, and the above-mentioned structural problem in FIGS. 6 and 7 can be solved so as to increase both the driving force and the amount of displacement, thereby achieving a small-scale and high-power electromechanical transducer. The above described effects are common in the following second to fifth embodiments in addition to the first embodiment.

[Second Embodiment]

Figure 8:
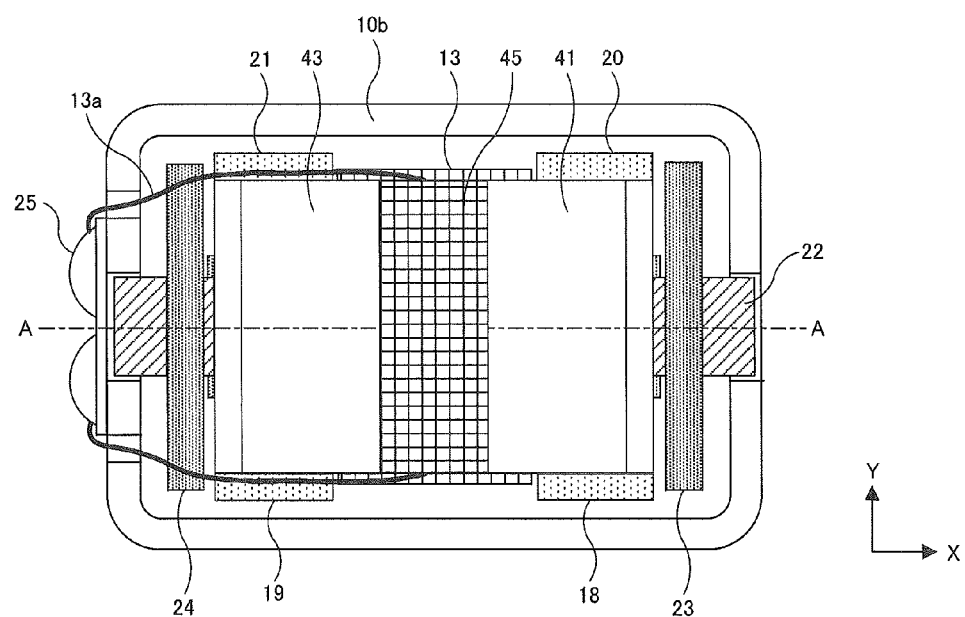
FIG. 8 is a top view showing an electromechanical transducer of a second embodiment as viewed from the upper side of the figure.
Figure 9:
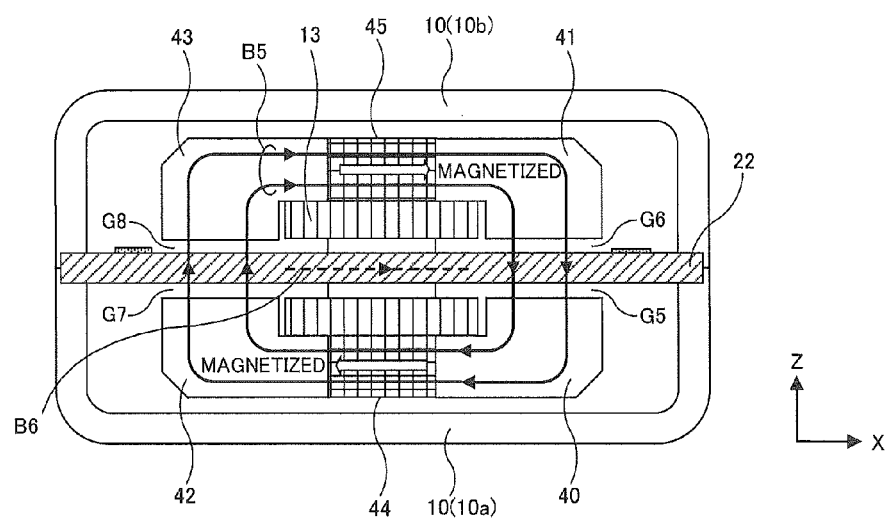
FIG. 9 is a cross-sectional structural view along an A-A cross section of FIG. 8.

Next, an electromechanical transducer of a second embodiment of the present invention will be described with reference to FIGS. 8 and 9. Most of the structure of the electromechanical transducer of the second embodiment is common to that of the first embodiment, and thus different points will be mainly described hereinafter. FIG. 8 is a top view (partially cutaway end view) showing the structure of the electromechanical transducer of the second embodiment, and FIG. 9 is a cross-sectional structural view along an A-A cross section of FIG. 8. FIGS. 8 and 9 correspond to FIGS. 2 and 5 of the first embodiment, respectively, in which the directions represented by X, Y and Z are also common.

In the electromechanical transducer of the second embodiment, constituent elements that are substantially the same as those in the first embodiment are denoted by the same symbols. Meanwhile, in the electromechanical transducer of the second embodiment, there are provided four yokes 40, 41, 42 and 43 and two magnets 44 and 45, of which structure and arrangement are different from the yokes 11 and 12 and the magnets 14 to 17 in the first embodiment.

Specifically, the lower yoke 40 and the upper yoke 41 face each other on one side along the X direction, and the lower yoke 42 and the upper yoke 43 face each other on the other side along the X direction. Then, one magnet 44 is adhesively bonded between the lower yokes 40 and 42, and the other magnet 45 is adhesively bonded between the upper yokes 41 and 43.

In the second embodiment, a magnetic circuit constituted by the armature 22, the yokes 40 to 43, the magnets 44 and 45, and the coil 13 is different from that in the first embodiment, but the magnetic circuit has the same function as the first embodiment. That is, as shown in FIG. 9, the lower magnet 44 and the upper magnet 45 are magnetized in directions reverse to each other, and a magnetic flux B5 indicated by solid arrows is generated in the yokes 40 to 43 and the armature 22 by these magnets 44 and 45. Further, when flowing the current in the coil 13, a magnetic flux B6 indicated by a dashed arrow is generated in the armature 22. Here, effects of the magnetic fluxes B5 and B6 of FIG. 9 are nearly common to the effects of the magnetic fluxes B1 and B2 of FIG. 5.

According to the structure of the second embodiment, in comparison with the structure of the first embodiment provided with the magnets 14 to 17, there may be provided only two magnets 44 and 45. However, since the magnets 44 and 45 are disposed away from the armature 22, it is important to appropriately position the armature 22 when no current flows in the coil 13. In the electromechanical transducer of the second embodiment, effects regarding the driving force and the amount of displacement are nearly the same as those in the first embodiment, so description thereof will be omitted.

[Third Embodiment]

Figure 10:
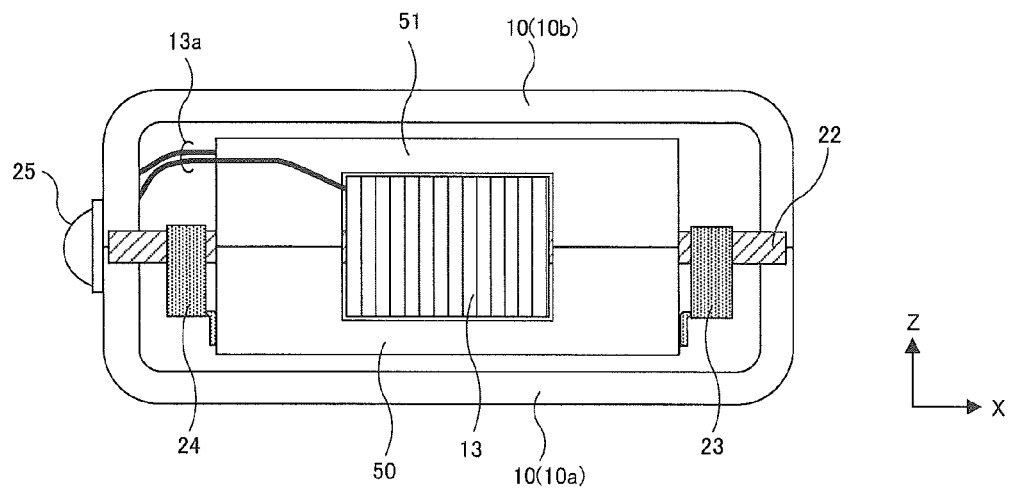
FIG. 10 is a front view showing a structure of the electromechanical transducer of a third embodiment.
Figure 11:
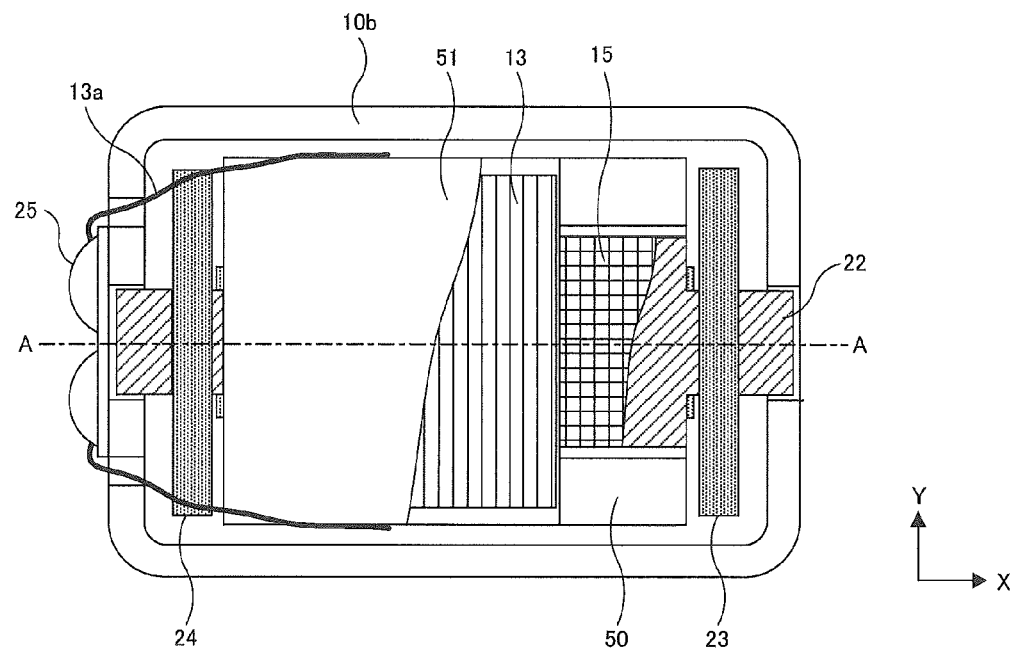
FIG. 11 is a top view showing the electromechanical transducer of FIG. 10 as viewed from the upper side of the figure.
Figure 12:
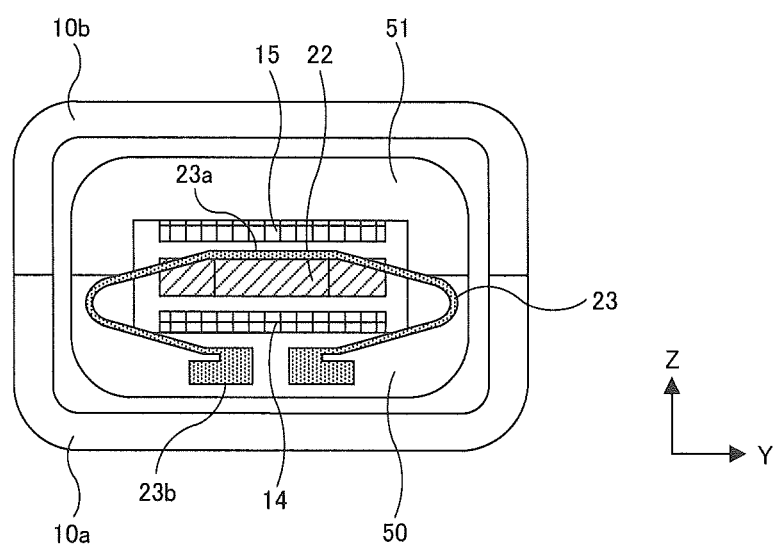
FIG. 12 is a right side view showing the electromechanical transducer of FIG. 10 as viewed from the right side of the figure.
Figure 13:
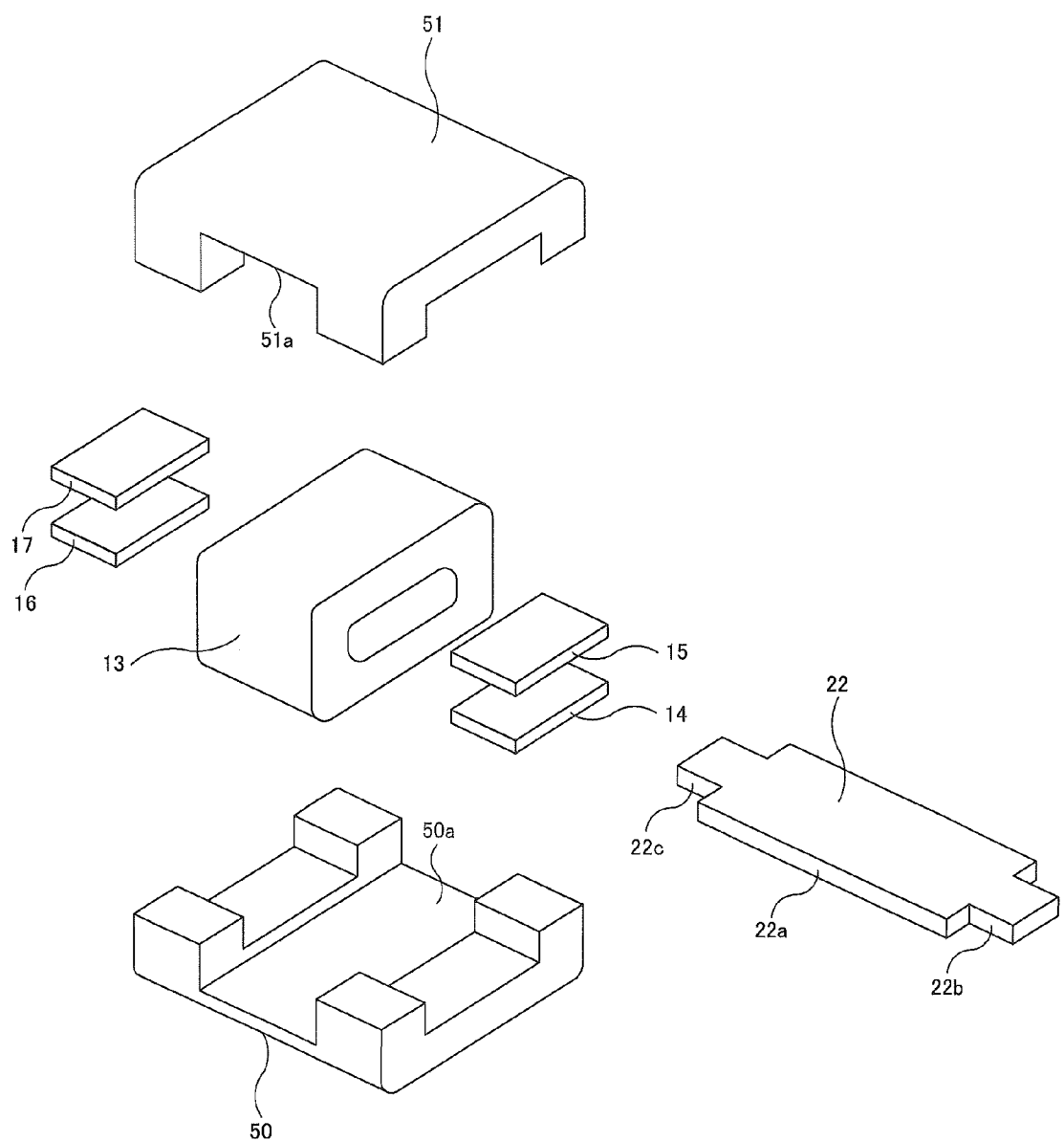
FIG. 13 is an exploded perspective view of the magnetic circuit portion in the electromechanical transducer of the third embodiment.

Next, an electromechanical transducer of a third embodiment of the present invention will be described with reference to FIGS. 10 to 13. Most of the structure of the electromechanical transducer of the third embodiment is common to that of the first embodiment, and thus different points will be mainly described hereinafter. FIG. 10 is a front view (partially cutaway end view) showing the structure of the electromechanical transducer of the third embodiment, FIG. 11 is a top view (partially cutaway end view) as viewed from the upper side of FIG. 10, FIG. 12 is a right side view (partially cutaway end view) as viewed from the right side of FIG. 10, and FIG. 13 is an exploded perspective view of a magnetic circuit portion in the electromechanical transducer of the third embodiment. FIGS. 10 to 13 correspond to FIGS. 1 to 4 of the first embodiment, respectively, in which the directions represented by X, Y and Z are also common. In addition, a cross-sectional structural view along an A-A cross section of FIG. 11 is common to FIG. 5 of the first embodiment. Also, in FIG. 11, a yoke 50 and a magnet 15 are partially removed.

In the electromechanical transducer of the third embodiment, constituent elements that are substantially the same as those in the first embodiment are denoted by the same symbols. Meanwhile, in the electromechanical transducer of the third embodiment, a difference from the first embodiment is that the four spacers 18 to 21 are not provided and yokes 50 and 51 that are vertically symmetrical to each other are joined together.

As shown in FIG. 13, inwardly facing concave portions 50a and 51a are formed in the lower yoke 50 and the upper yoke, respectively, and respective four corner portions of the concave portions 50a and 50b on both sides are joined each other so as to form an integrated yoke. Thereby, the yokes 50 and 51 have a supporting structure that is similar to the spacers 18 to 21 of the first embodiment, and thus the spacers 18 to 21 are not required. In the magnetic circuit of the third embodiment, there are the magnetic flux B1 (solid arrow) generated by the magnets 14 to 17 and the magnetic flux B2 generated by the coil current, respectively, in the same manner as in FIG. 5 of the first embodiment. However, as shown in FIG. 12, since side portions of the yoke 50 exist in the structure of the third embodiment, the magnetic flux B1 includes not only a loop component in an XZ plane, but also a loop component in a YZ plane, in the same manner as the magnetic flux B3 (FIG. 7) of the comparison example. In the electromechanical transducer of the third embodiment, effects regarding the driving force and the amount of displacement are nearly the same as those in the first embodiment, so description thereof will be omitted.

[Fourth Embodiment]

Figure 14:
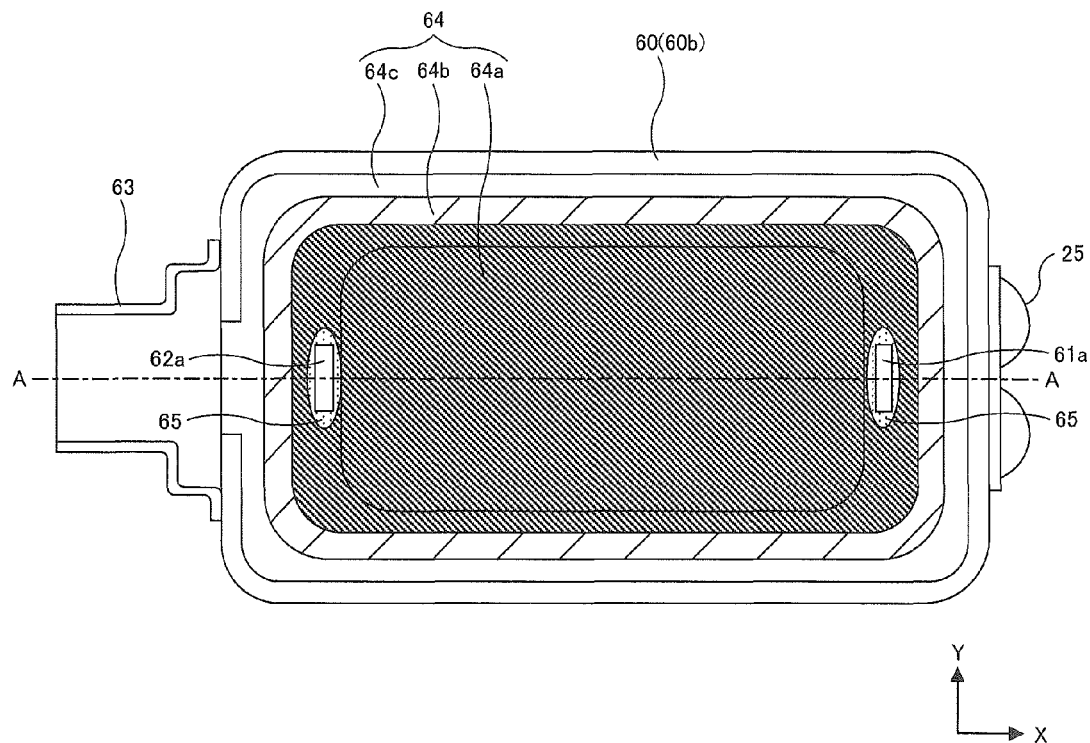
FIG. 14 is a top view showing a structure of an electroacoustic transducer of a fourth embodiment.
Figure 15:
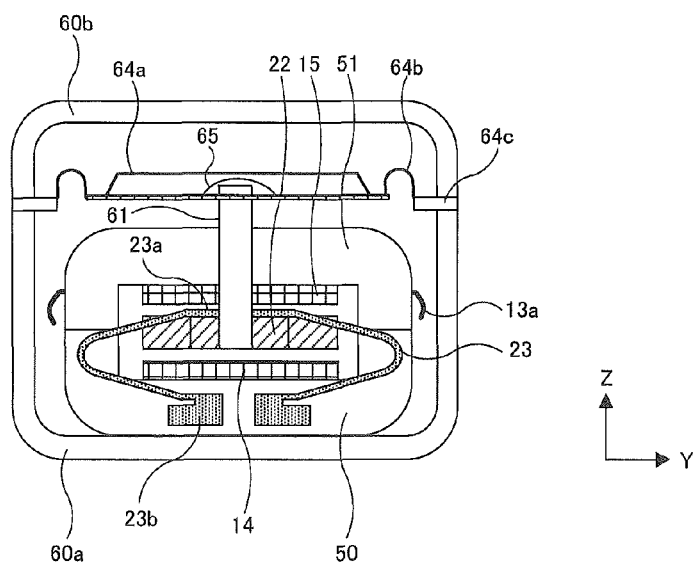
FIG. 15 is a right side view showing the electroacoustic transducer of FIG. 14 as viewed from the right side of the figure.
Figure 16:
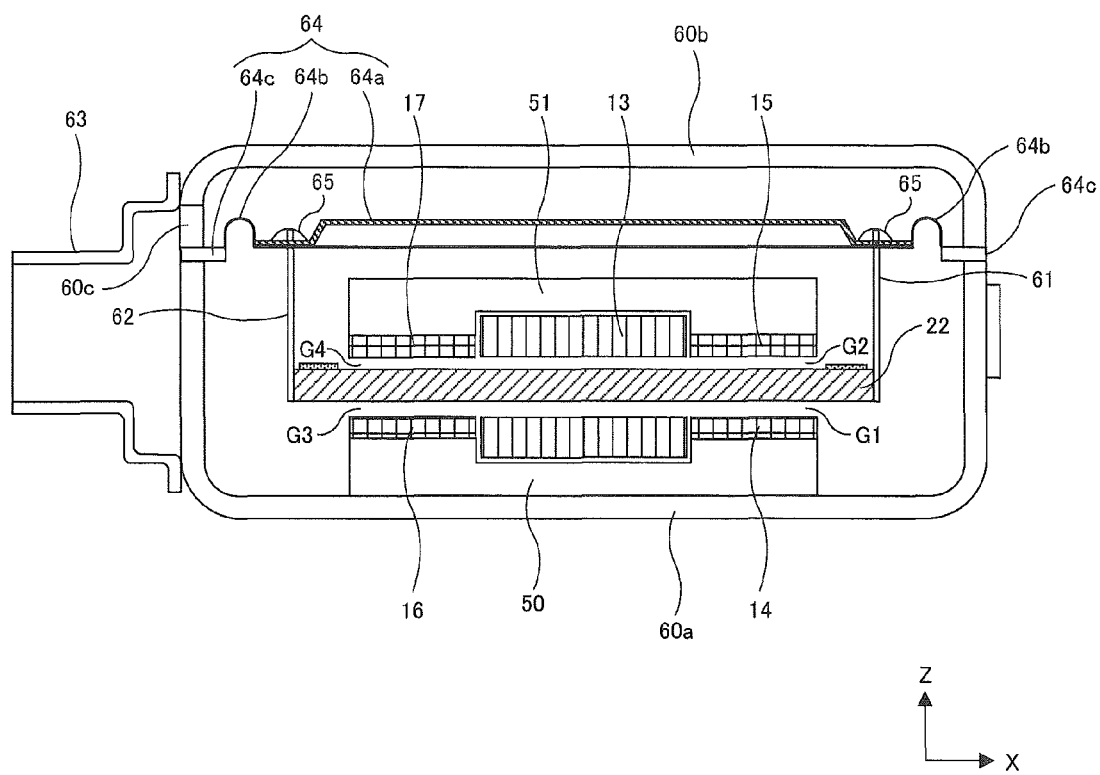
FIG. 16 is a cross-sectional structural view along an A-A cross section of FIG. 14.

Next, an electroacoustic transducer of a fourth embodiment of the present invention will be described with reference to FIGS. 14 to 16. Although the first to third embodiments show the examples of the electromechanical transducers that transduce the electric signal into the mechanical vibration, the fourth embodiment will show an example of the electroacoustic transducer that transduces an electric signal into sound and outputs the sound. FIG. 14 is a top view (partially cutaway end view) showing a structure of the electroacoustic transducer of the fourth embodiment, FIG. 15 is a right side view (partially cutaway end view) as viewed from the right side of FIG. 14, and FIG. 16 is a cross-sectional structural view along an A-A cross section of FIG. 14. FIGS. 14 to 16 correspond to FIGS. 2, 3 and 5 of the first embodiment, respectively, in which the directions represented by X, Y and Z are also common.

The electroacoustic transducer of the fourth embodiment includes a driving unit having substantially the same structure as the driving unit of the third embodiment, and thus description of the driving unit of the fourth embodiment will be omitted, in which constituent elements are denoted by the same symbols as the third embodiments. In the fourth embodiment, as shown in FIGS. 15 and 16, the yoke 50 is fixed to a lower housing member 60a by laser welding or the like, while the armature 22 is not fixed to a housing 60, and a pair of plate-like rods 61 and 62 is fixed to both ends of the armature 22 by laser welding or the like. Then, a diaphragm assembly unit 64 is disposed at an end portion of the housing 60, and top end portions 61a and 62a of the rods 61 and 62 that extend upward penetrate through two rectangle holes on both sides of the diaphragm assembly unit 64 and are fixed thereto by adhesive 65, respectively. A frame portion 64c formed along an outer side of the diaphragm assembly unit 64 is integrally fixed to the housing 60 via several joints by laser welding at a position sandwiched between the lower housing member 60a and the upper housing member 60b that form the housing 60. In addition, the housing 60 and the frame portion 64c are formed in the same shape in a planar view in FIG. 14.

In the diaphragm assembly unit 64, a film-like corrugation 64b is expanded along an inner side of the frame portion 64c, and a diaphragm 64a is bonded all around the corrugation 64b. The role of the corrugation 64b is that, when the diaphragm 64a is vibrated in the Z direction, the corrugation 64b separates a space inside the housing 60 and effectively generates sound pressure without hindering the vibration. Further, as shown in FIG. 16, a notch 60c is formed at one end of the upper housing member 60b, a sound outlet 63 is attached outward to the portion where the notch 60c is formed, and the sound outlet 63 is fixed to the upper and lower housing members 60a and 60b by laser welding. By the above structure, when the armature 22 is vertically vibrated by flowing the current in the coil 13, the sound pressure is generated by vertical translational vibration of the diaphragm 64a through the two rods 61 and 62, which is externally outputted from the sound outlet 63. In addition, in order to prevent leakage of the sound from joints between the housing 60 and the frame portion 64c and joints between the housing 60 and the sound outlet 63, these joints are sealed by adhesive.

[Fifth Embodiment]

Figure 17:
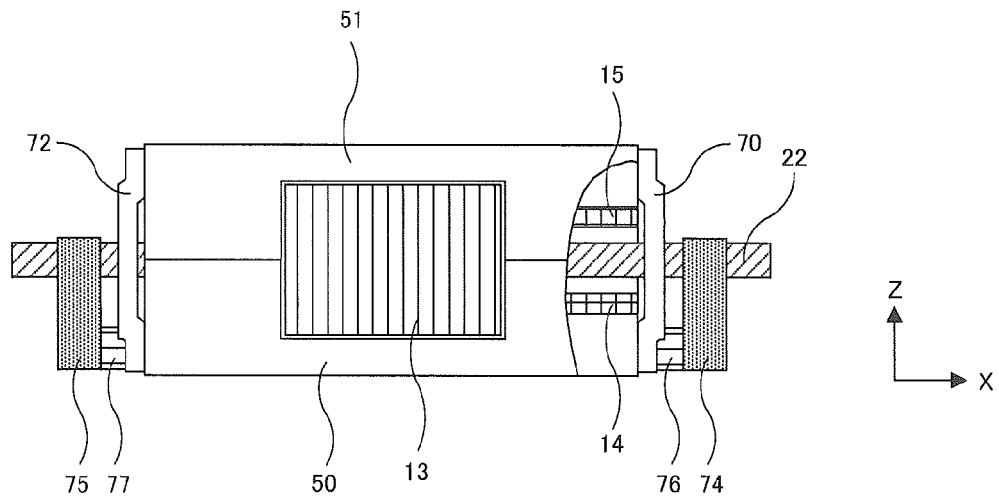
FIG. 17 is a front view showing a structure of a principal part of an electromechanical transducer of a fifth embodiment.
Figure 18:
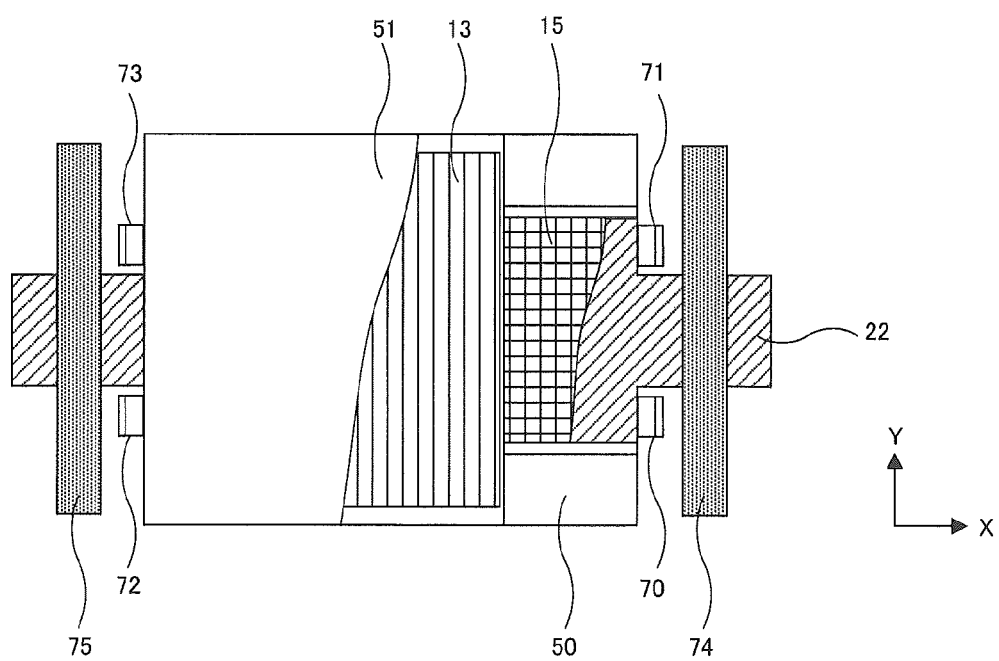
FIG. 18 is a top view showing the principal part of the electromechanical transducer of FIG. 17 as viewed from the upper side of the figure.
Figure 19:
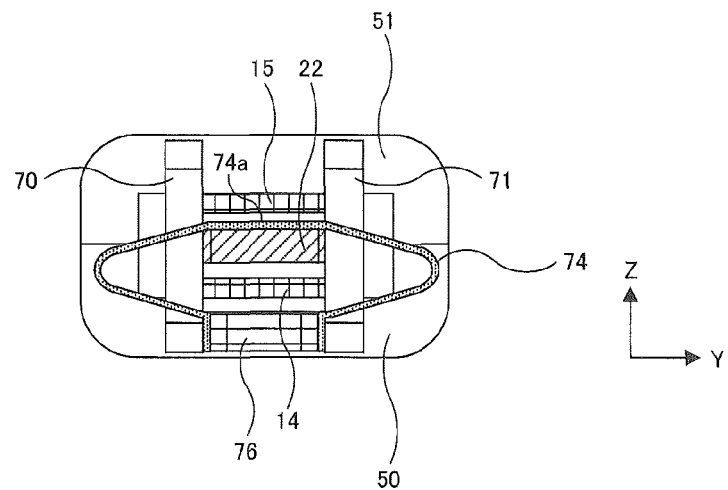
FIG. 19 is a right side view showing the principal part of the electromechanical transducer of FIG. 17 as viewed from the right side of the figure.

Next, an electromechanical transducer of a fifth embodiment of the present invention will be described with reference to FIGS. 17 to 20. Most of the structure of the electromechanical transducer of the fifth embodiment is common to that of the third embodiment, and thus different points will be mainly described hereinafter. FIG. 17 is a front view (partially cutaway end view) showing a structure of a principal part of the electromechanical transducer of the fifth embodiment, FIG. 18 is a top view (partially cutaway end view) as viewed from the upper side of FIG. 17, and FIG. 19 is a right side view (partially cutaway end view) as viewed from the right side of FIG. 17. FIGS. 17 to 19 correspond to FIGS. 10 to 12 of the third embodiment, respectively, in which the directions represented by X, Y and Z are also common. However, the housing 10 and components associated therewith are omitted in the figures for simplicity. Also, in FIGS. 17 and 18, the yokes 50 and 51 and the magnet 15 are partially removed.

In the electromechanical transducer of the fifth embodiment constituent elements that are substantially the same as those in the third embodiment are denoted by the same symbols. A feature of the fifth embodiment is to take measures against the shock in the electromechanical transducer of the third embodiment. As shown in FIG. 17, the electromechanical transducer of the fifth embodiment is provided with four protectors 70, 71, 72 and 73 for the purpose of taking measures against the shock. A pair of protectors 70 and 71 is fixed to one end portions of the yokes 50 and 51 in the X direction by laser welding or the like, and a pair of protectors 72 and 73 is fixed to the other end portions of the yokes 50 and 51 in the X direction by laser welding or the like. Each of the protectors 70 to 73 is a plate-like member having a cross sectional shape in which portions of both ends protrude slightly from a central portion, as shown in FIG. 17. The protectors 70 to 73 are arranged opposite to the inner portion 22a of the armature 22 with appropriate interspaces in the X direction, as shown in FIG. 17, and also opposite to the outer portions 22b and 22c of the armature 22 with appropriate interspaces in the Y direction, as shown in FIG. 18.

In the fifth embodiment, by providing the protectors 70 to 73 arranged opposite to the armature 22 with the interspaces as described above, it is possible to restrict a range of relative movement between the armature 22 and the yokes 50 and 51 in the X and Y directions, thereby improving the shock resistance. In addition, it is preferable to set sizes of the interspaces between the armature 22 and the protectors 70 to 73 to be small so that the deformation of the spring members 74 and 75 and the like does not exceed their elasticity range when the armature 22 and the protectors 70 to 73 collide with each other due to a shock. In the fifth embodiment, measures against the shock have been considered for the armature 22 in the X and Y directions, and additionally it is possible to take measures against the shock in the Z direction. However, in general, the spring members 74 and 75 are designed so as not to exceed their elasticity range even if the armature 22 is relatively displaced by the size of the air gaps G1 to G4 (FIG. 5) due to a shock in the Z direction. Accordingly, there is no need to provide protectors for measures against the shock in the Z direction. In addition, the protectors 70 to 73 need to be designed so that deformation strength and weld strength between the protectors 70 to 73 and the yokes 50 and 51 satisfy design values required to obtain the shock resistance.

Figure 20:
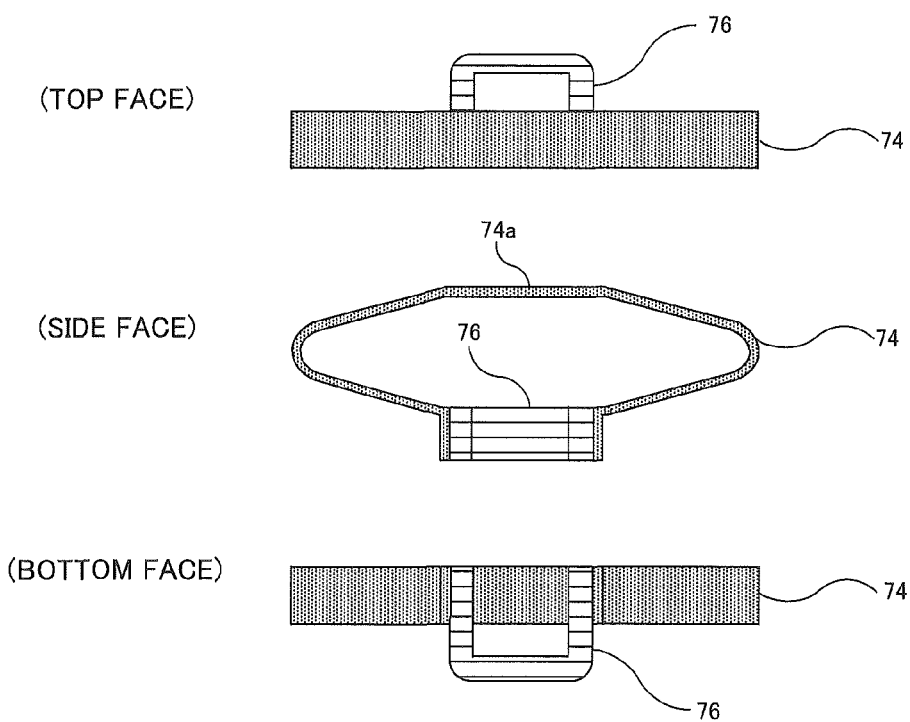
FIG. 20 is a view of an enlarged structure of a spring member and a spring base.

Further, in the fifth embodiment, regarding the above-described measures against the shock, the structure of the spring members 74 and 75 is different from that of the spring members 23 and 24 in the first to fourth embodiments. That is, base end portions of the spring members 74 and 75 of the fifth embodiment are fixed to spring bases 76 and 77, respectively. These spring bases 76 and 77 are provided at portions corresponding to the end portions 23b and 24b of the spring members 23 and 24 of the first to fourth embodiments, and are disposed at positions contacting with the lower yoke 50 and the protectors 70 to 73. Here, FIG. 20 shows an enlarged structure of the spring member 74 and the spring base 76 attached thereto. As shown in FIG. 20, the spring base 76 has a lateral U-shape in a cross-section in a planar view, and is sandwiched between and fixed to the base end portions of the spring member 74.

As described above, the electromechanical transducer and the electroacoustic transducer of the present invention have been described based on the first to fifth embodiments. However the present invention is not limited to the above embodiments and can be variously modified without departing the essentials of the invention. For example, the electromechanical transducer of the present invention can be applied to a hearing aid that is placed in a cavum conchae of a user's ear. By this, both the vibration itself of the electromechanical transducer and the sound generated by the vibration of the housing can function as transmission means, and the sound can be transmitted to the user's ear. In case of applying such an electromechanical transducer to the hearing aid that is placed in the cavum conchae, it is preferable to form the housing 10 so as to have an outer shape suitable for being placed in the cavum conchae.

The invention claimed is:

1. An electromechanical transducer transducing an electric signal into mechanical vibration, the electromechanical transducer comprising:
a structural unit in which at least one pair of magnets, one or more yokes conducting a magnetic flux generated by the magnets, and a coil supplied with the electric signal are integrally arranged;
a plate-like armature including an inner portion disposed to pass through an internal space of the structural unit and first and second outer portions protruding on both sides from the inner portion, the armature constituting a magnetic circuit with the structural unit via two regions through which components of the magnetic flux flow in directions opposite to each other in the inner portion and being displaced in a direction parallel to a direction of the magnetic flux at the two regions relative to the structural unit;
air gaps respectively formed between the two regions and the structural unit;
a first elastic member connecting between the first outer portion of the armature and the structural unit; and
a second elastic member connecting between the second outer portion of the armature and the structural unit,
wherein the magnetic flux generated by the magnets is changed in accordance with a displacement of the armature.

2. The electromechanical transducer according to claim 1, wherein the first and second elastic members comprise a pair of spring members.

3. The electromechanical transducer according to claim 1, further comprising a housing in which the structural unit, the armature and the first and second elastic members are entirely contained,
wherein respective ends of the first and second outer portions of the armature are fixed to the housing.

4. The electromechanical transducer according to claim 1, wherein the at least one pair of magnets comprises two pairs of magnets facing each other with the air gaps in the two regions respectively.

5. The electromechanical transducer according to claim 1, further comprising protectors located in vicinities of the first and second outer portions of the armature in the structural unit, the protectors limiting range of a movement of the armature relative to the structural unit.

6. An electroacoustic transducer transducing an electric signal into sound, the electroacoustic transducer comprising:
a structural unit in which at least one pair of magnets, one or more yokes conducting a magnetic flux generated by the magnets, and a coil supplied with the electric signal are integrally arranged;
a plate-like armature including an inner portion disposed to pass through an internal space of the structural unit and first and second outer portions protruding on both sides from the inner portion, the amiature constituting a magnetic circuit with the structural unit via two regions through which components of the magnetic flux flow in directions opposite to each other in the inner portion and being displaced in a direction parallel to a direction of the magnetic flux at the two regions relative to the structural unit;
air gaps respectively formed between the two regions and the structural unit;
a first elastic member connecting between the first outer portion of the armature and the structural unit;
a second elastic member connecting between the second outer portion of the armature and the structural unit;
a pair of rods each having one end fixed to each of ends of the first and second outer portions of the armature; and
a diaphragm connected to respective other ends of the pair of rods, the diaphragm generating sound pressure in response to vibration of the armature relative to the structural unit,
wherein the magnetic flux generated by the magnets is changed in accordance with a displacement of the armature.

7. The electromechanical transducer according to claim 1, wherein the air gaps include parallel interspaces extending between the two regions and the structural unit.

8. The electromechanical transducer according to claim 1, wherein the internal space of the structural unit that holds the inner portion of the armature includes a space that faces the yokes.

9. The electromechanical transducer according to claim 1, wherein a width of the first and second outer portions of the armature is less than a width of the magnets.

10. The electromechanical transducer according to claim 1, wherein the first elastic member and the second elastic member are configured such that, when the armature is relatively displaced in the magnetic circuit relative to the air gaps, the first elastic member and the second elastic member provide a restoring force that is proportional to an amount of the displacement to the armature.

11. The electromechanical transducer according to claim 6, wherein the air gaps include parallel interspaces extending between the two regions and the structural unit.

12. The electromechanical transducer according to claim 6, wherein the internal space of the structural unit that holds the inner portion of the armature includes a space that faces the yokes.

13. The electromechanical transducer according to claim 6, wherein a width of the first and second outer portions of the &mature is less than a width of the magnets.

14. The electromechanical transducer according to claim 6, wherein the first elastic member and the second elastic member are configured such that, when the armature is relatively displaced in the magnetic circuit relative to the air gaps, the first elastic member and the second elastic member provide a restoring force that is proportional to an amount of the displacement to the armature.

* * * * *